United States Patent
Garney

(10) Patent No.: US 7,277,993 B2
(45) Date of Patent: *Oct. 2, 2007

(54) WRITE-BACK DISK CACHE

(75) Inventor: John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 10/726,418

(22) Filed: Dec. 3, 2003

(65) Prior Publication Data

US 2005/0125606 A1 Jun. 9, 2005

(51) Int. Cl.
G06F 12/00 (2006.01)

(52) U.S. Cl. ...................................... 711/143
(58) Field of Classification Search ............... 711/118, 711/154, 171, 113, 143; 710/6, 316; 714/3; 713/2, 340; 717/154, 176
See application file for complete search history.

(56) References Cited

U.S. PATENT DOCUMENTS

| | | | | |
|---|---|---|---|---|
| 4,296,465 A | * | 10/1981 | Lemak | 710/316 |
| 4,972,316 A | * | 11/1990 | Dixon et al. | 711/113 |
| 5,142,680 A | * | 8/1992 | Ottman et al. | 717/176 |
| 5,574,920 A | * | 11/1996 | Parry | 713/340 |
| 5,764,922 A | * | 6/1998 | Peacock et al. | 710/6 |
| 6,453,404 B1 | * | 9/2002 | Bereznyi et al. | 711/171 |
| 6,606,685 B2 | * | 8/2003 | Huxoll | 711/118 |
| 6,647,508 B2 | * | 11/2003 | Zalewski et al. | 714/3 |
| 6,687,819 B1 | * | 2/2004 | Aguilar et al. | 713/2 |
| 6,698,015 B1 | * | 2/2004 | Moberg et al. | 717/154 |
| 6,973,447 B1 | * | 12/2005 | Aguilar et al. | 707/1 |
| 2004/0268026 A1 | * | 12/2004 | Royer, Jr. et al. | 711/104 |
| 2005/0015566 A1 | * | 1/2005 | Zohar et al. | 711/203 |

OTHER PUBLICATIONS

IBM Technical Disclosure Bulletin NN8812136, "Automatic Cache Disabing for Low Read Hit Ratios", Dec. 1, 1998.*
IBM Tehcnical Disclosure Bulletin NNRD416101, "Algorithem for the Assured Placement of Files into a Syncpoint Enabled System", Dec. 1, 1998.*
Martin Rinard, "Operating System Lecture Notes, Lecture 13, File System Implementation" 1998 MIT.*

* cited by examiner

Primary Examiner—Pierre Bataille
Assistant Examiner—Paul Schlie
(74) Attorney, Agent, or Firm—Trop, Pruner & Hu, P.C.

(57) ABSTRACT

Processor-based systems may use more than one software routine or method to access a write-back cache. If the methods are inconsistent, the data in the write-back cache may be incoherent with a disk drive that is being cached. A method and apparatus for preserving coherent data in a write-back disk cache may include writing dirty cache lines to a disk drive and monitoring for disk write requests, prior to a disk driver loading.

33 Claims, 4 Drawing Sheets

WRITE-BACK DISK CACHE

BACKGROUND

This invention relates generally to disk caching for processor-based systems and more particularly to preserving coherency in a write-back disk cache.

Peripheral devices such as disk drives used in processor-based systems may be slower than other circuitry in those systems. There have been many attempts to increase the performance of disk drives. However, because disk drives are electromechanical in nature, there may be a finite limit beyond which performance cannot be increased.

One way to reduce the information bottleneck at the peripheral device, such as disk drives, is to use a cache. A cache is a memory device that logically resides between a device, such as a disk drive, and the remainder of the processor-based system. A cache is a memory location that serves as a temporary storage area for a device, such as the disk drive. Frequently accessed data resides in the cache after an initial access. Subsequent accesses to the same data may be made to the cache instead of to the disk drive.

Generally, two types of disk cache are used, write-through cache and write-back cache. Write-through disk cache means that the information is written both to the cache and to the corresponding disk drive. Write-back disk cache means that information is only written to the cache, and the information is only written to the corresponding disk drive when the data in the cache is being replaced with some other disk drive data. Write-back is faster than write-through cache (since writing to the slower disk is avoided on write operations) but may cause coherency problems since the data in the cache may be different (dirty) than in the corresponding disk drive. A cache line of data is dirty if the data in the cache line has been updated by the system but the corresponding disk drive has not been updated. A clean cache line is a line of data in the cache whose corresponding disk drive has the same data.

Caches are typically much smaller capacity compared to disk drives, but the most important data is kept in the cache for fastest access.

A processor-based system may use a write-back disk cache on a disk drive that is used during the normal operation of the computer and used to start (boot-up) the system. During the system start-up, the disk may be accessed by a basic input/output system (BIOS) disk request. Later in the start-up and after an operating system loads a disk drive software driver (operating system disk driver), the disk may be accessed by the operating system disk driver write request. However, the BIOS write request and the operating system disk driver write request may access or manipulate the cache and the disk drive inconsistently. Additionally, if a system crash occurs during an operation that precludes flushing the state of any dirty cache lines to the disk, the BIOS disk request may not access coherent data before the operating system disk driver loads.

Thus, there may be a need for alternative ways of implementing a disk cache.

DETAILED DESCRIPTION

Figure 1:
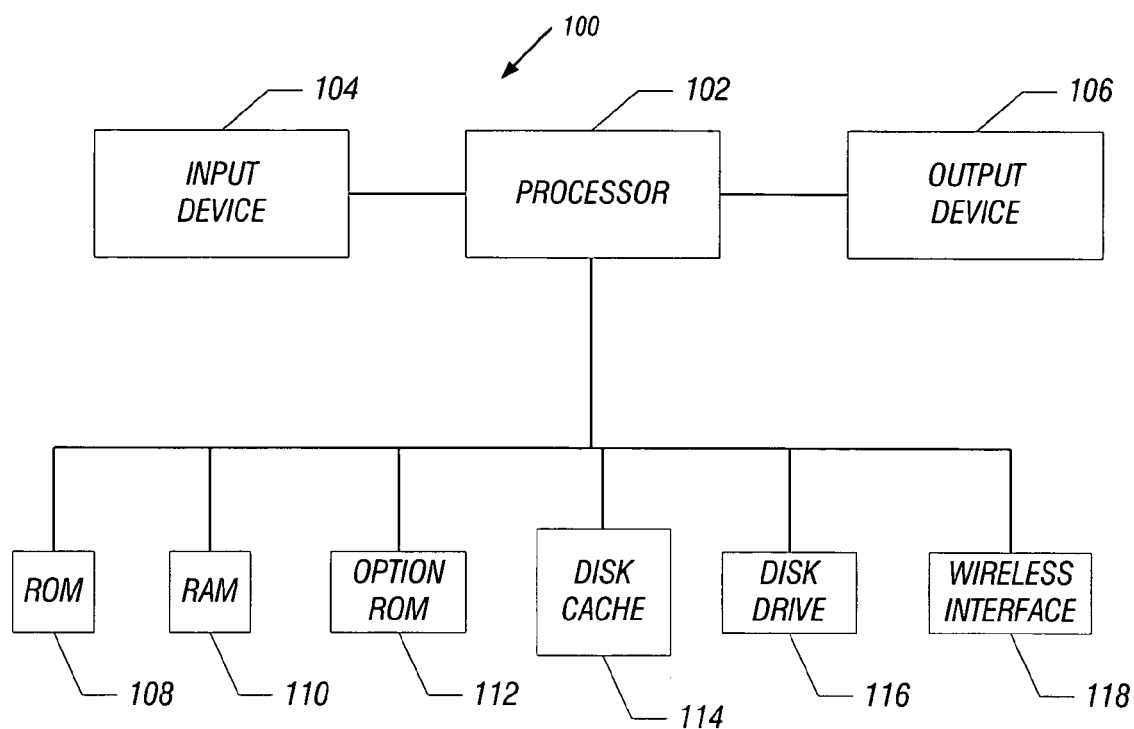
FIG. 1 is a block diagram of a processor-based system in accordance with an embodiment of the present invention.

Referring to FIG. 1, the processor-based system 100 may be a desktop computer, a laptop computer, a server, or any of a variety of other processor-based systems.

The system 100 may include an input device 104 coupled to the processor 102. The input device 104 may include a keyboard or a mouse. The system 100 may also include an output device 106 coupled to the processor 102. The output device 106 may include a display device such as a cathode ray tube monitor, liquid crystal display, or a printer. Liquid crystal displays may use super twisted nematics (STN) or thin film transistor (TFT) technologies.

Additionally, the processor 102 may be coupled to any number of memory devices such as a read only memory (ROM) 108, a random access memory (RAM) 110, an option ROM 112, a disk cache memory 114, or a disk drive 116. The disk drive 116 may be a floppy disk, hard disk, solid state disk, compact disk (CD) or digital video disk (DVD), or any other disk device that may be used in computer or consumer systems. In one embodiment, the system 100 may enable a wireless network access using a wireless interface 118. The wireless interface 118 may be a radio frequency interface, as one example, including a transceiver and an antenna. However, the present invention is not limited to processor-based systems that permit wireless access.

Disk cache 114 may be made from a ferroelectric polymer memory. Data may be stored in layers within the memory. The higher the number of layers, the higher the capacity of the memory. Each of the polymer layers includes polymer chains with dipole moments. Data may be stored by changing the polarization of the polymer between metal lines.

Ferroelectric polymer memories are non-volatile memories with sufficiently fast read and write speeds. For example, microsecond initial reads may be possible with write speeds comparable to those with flash memories.

In the typical operation of system 100, the processor 102 may access ROM 108 to execute a power on start-up test (POST) program and/or a basic input output system (BIOS) program. The processor may use the BIOS and POST software to initialize the system 100. The processor 102 may then access disk drive 116 to retrieve operating system software. The disk drive 116 may be a hard disk, floppy disk, or any other type of disk equivalent including solid state disk devices. The system 100 may also receive input from the input device 104 or may run an application program stored in memory or accessed from the wireless device 118. System 100 may also display the system 100 activity on the output device 106. The RAM 110 may be used to hold application programs or data that is used by processor 102. The disk cache 114 may be used to cache data for disk drive 116.

Figure 2:
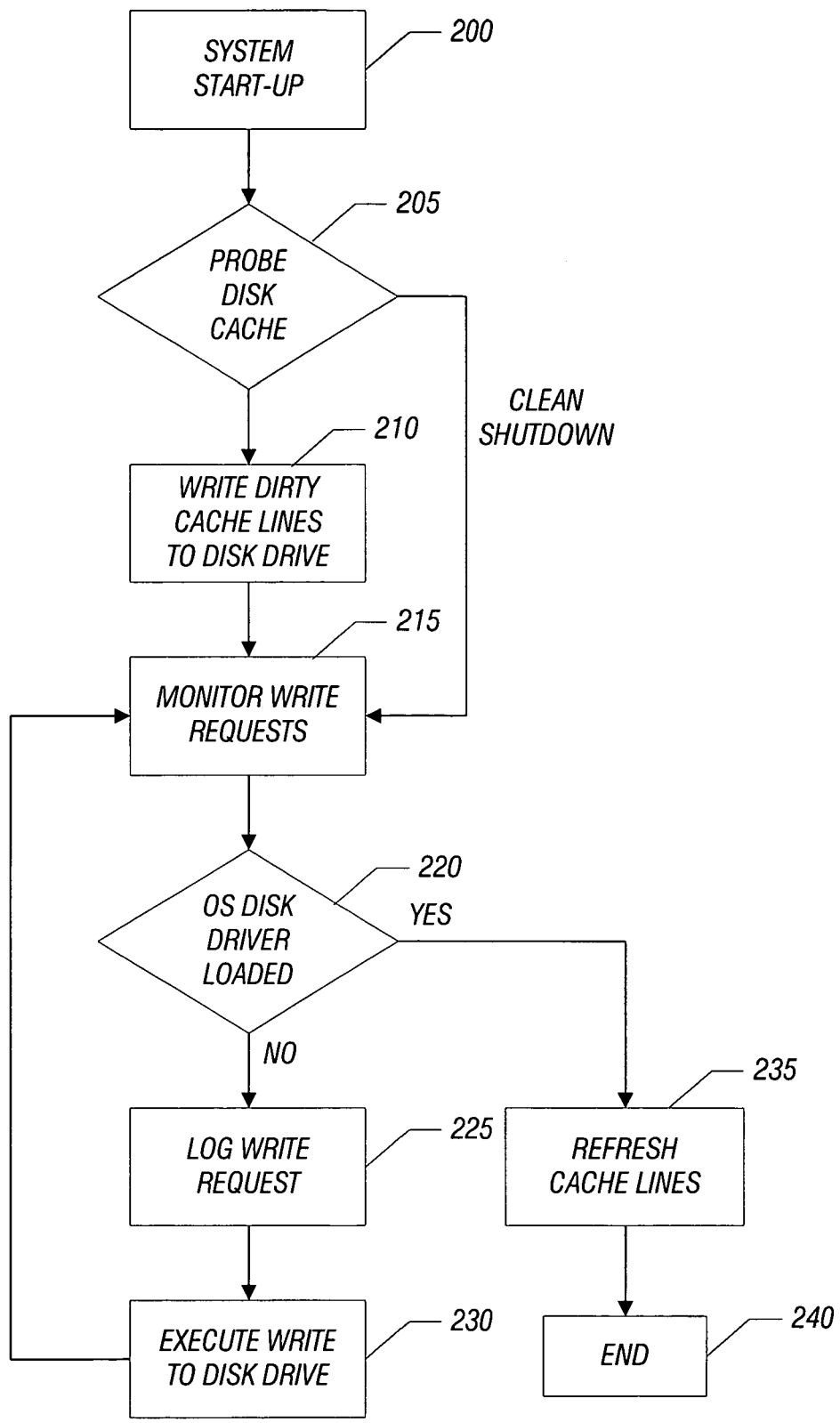
FIG. 2 is a flowchart in accordance with an embodiment of the present invention.

Referring to FIG. 2, an algorithm for disk caching in a processor-based system is disclosed. After the system start-up, block 200, which may also be referred to as a system boot or re-boot, the disk cache 114 (in FIG. 1) is probed to determine if the system was shutdown cleanly, as indicated in diamond 205. A clean shut-down in a system that has write-back cache is when the write-back cache has written back (flushed) any data that was dirty back to the disk drive. This results in there being no dirty data in the cache when the system is shutdown. If the system was shutdown cleanly, then write requests are monitored as shown in block 215. If the system was not shutdown cleanly, the dirty cache lines are written to the disk drive 116 (in FIG. 1), as indicated in block 210. A dirty cache line is a line of data that has been modified, but not flushed, and is therefore incoherent with the disk drive. After having cleaned the dirty cache lines, write requests are monitored as indicated in block 215. After a write request is detected and if the operating system disk driver has not been loaded, as illustrated in diamond 220, then the write request is logged, as indicated in block 225. After being logged, the write request is executed by writing to the disk drive, as indicated in block 230. Write requests are again monitored in block 215. However, if the operating system disk driver has been loaded, as indicated in diamond 220, then the cache lines are refreshed by reading disk locations which have data stored in the cache corresponding to disk location information previously logged by the option ROM as shown in block 235 and the algorithm is completed as indicated in block 240.

Figure 3:
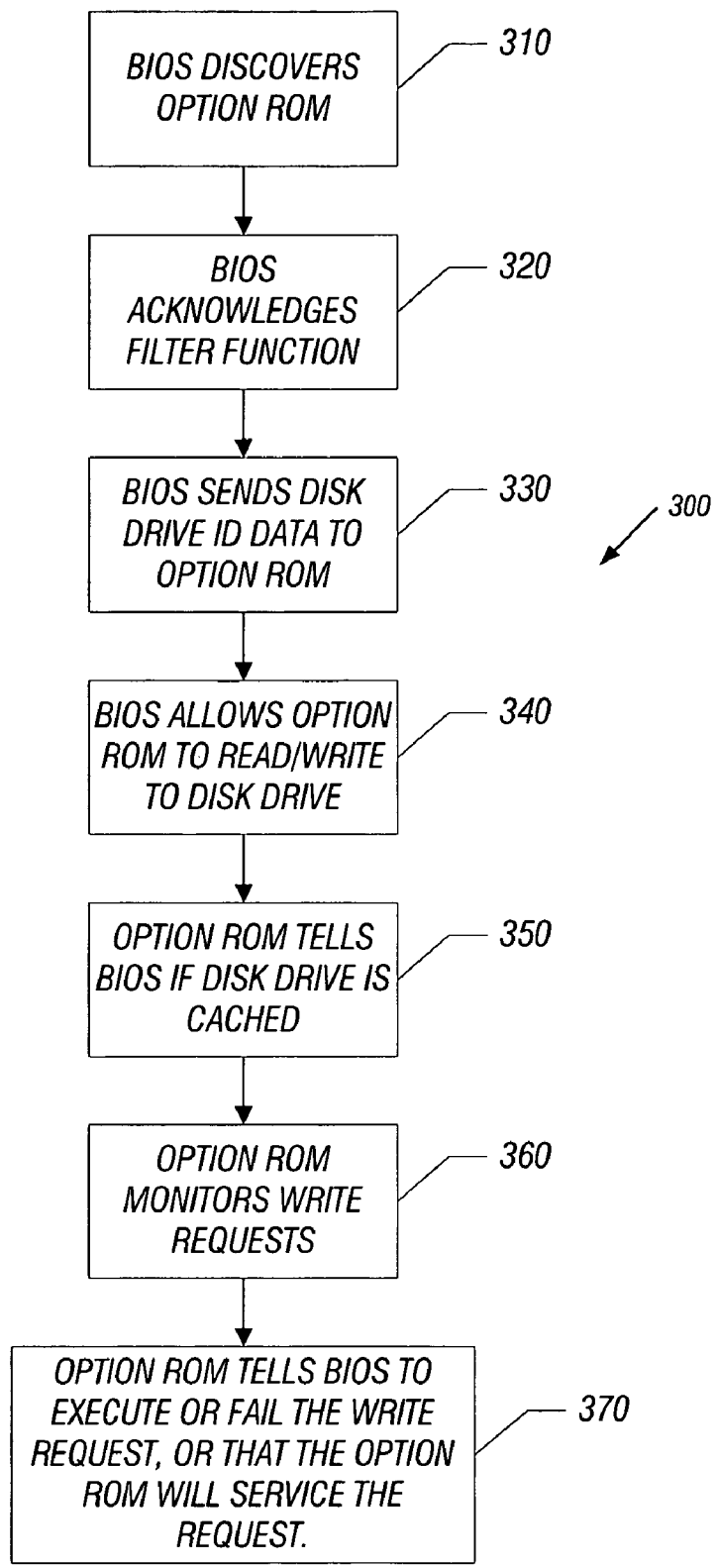
FIG. 3 is a flowchart in accordance with another embodiment of the present invention.

Referring to FIG. 3, an algorithm 300 provides a BIOS/option ROM interface or communication protocol which may allow the software code stored in an option ROM 112, when executed, (FIG. 1) to monitor and execute write requests. During system start-up, the executed BIOS code may discover the presence of an option ROM 112 during the initialization of the system 100, as illustrated in block 310. In response to the discovery, the executed BIOS code may acknowledge to the option ROM 112 that the BIOS code supports the option ROM code filter function, which may include filtering disk requests, as illustrated in block 320. The option ROM filter function may include code for monitoring disk requests, such as interrupt 13 disk requests, and writing to disk drives.

When the executed BIOS code discovers a disk drive that may support disk caching, the BIOS code may invoke the option ROM entry point that communicates to the option ROM that the cache supported disk drive has been discovered so that BIOS can communicate the disk drive identification data to the option ROM 112, as illustrated in block 330. Then, the executed BIOS code may allow the option ROM 112 code to read and write to the disk drive 116 of FIG. 1, as in block 340. The option ROM 112, by executing code, may determine if the disk drive is cached; based on reading, for an example, a disk drive's non-volatile memory. The option ROM may communicate its determination to BIOS, as illustrated in block 350.

In block 360, the executed BIOS code invokes option ROM code to filter disk requests when a disk request is made for a disk drive that is cached. The executed option ROM 112 code may at this point monitor the system for write requests, as in block 215 in FIG. 2 and in block 360 in FIG. 3, and also log write requests to non-volatile memory, as in block 225 of FIG. 2. The executed option ROM 112 code may return to BIOS data which tells BIOS, as shown in block 370, to execute or fail the write request, or that the option ROM will service the request.

For logged write requests, the option ROM may record the location on the disk, but does not save the actual disk data. Then the option ROM may cause the normal BIOS interrupt 13 disk write routine to perform the requested disk write.

Figure 4:
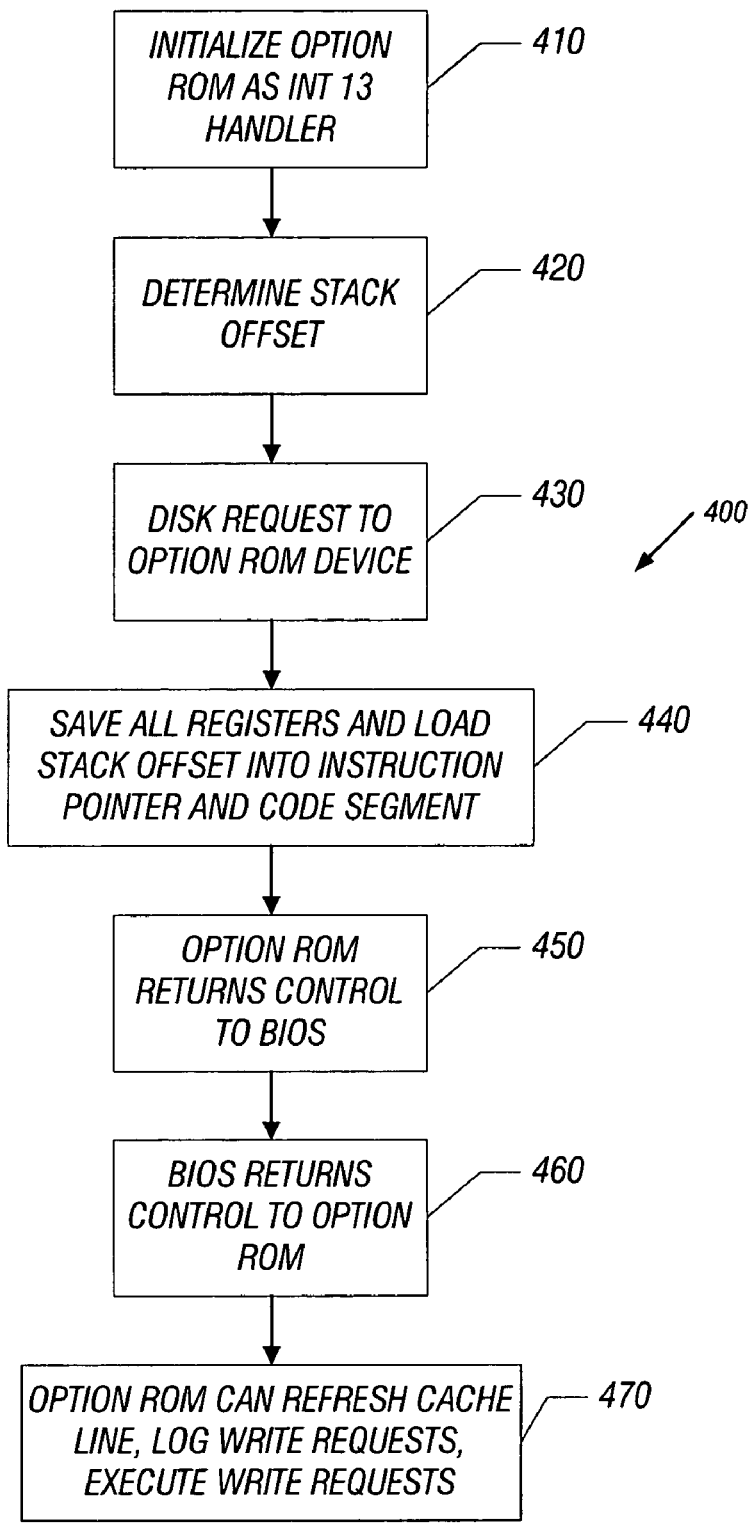
FIG. 4 is a flowchart in accordance with another embodiment of the present invention.

In another embodiment, an option ROM 112 (FIG. 1) may monitor the write requests of block 215 in FIG. 2 by having the executed option ROM code modify the processor stack. The executed option ROM 112 code may modify the processor stack, in one example, by using the algorithm 400 in FIG. 4. In block 410, the executed option ROM code initializes as a normal interrupt 13 handler by identifying disk drives that it supports. After the BIOS code finishes its initialization of the option ROM and allows the option ROM code to make interrupt 13 disks requests for the disk drives that are supported by the option ROM, the executed option ROM code then determines the stack offset, as illustrated in block 420. To determine the stack offset, in one example, the executed option ROM code stores the current stack location and then invokes a disk request for a disk drive that is supported by the subject option ROM. The option ROM code, since it is in the initialization process, saves the stack pointer at the point of invocation and returns with failure response. Upon return, a stack finder code can determine how far down the stack the return instruction pointer and return code segment are from the option ROM's interrupt 13 invocation. This may be the stack offset. The option ROM code may then set a flag so that future invocations of the option ROM can be normally processed.

During subsequent interrupt 13 write requests such as in Block 430, the executed option ROM code may replace the instruction pointer and code segment at the determined stack offset with another option ROM execution address, as illustrated in block 440. In block 450, the executed option ROM code returns control to the BIOS code which will in turn return to what it thinks is the original requester of an interrupt 13 disk request operation. However, since the stack instruction pointer and code segment have been changed, control will actually revert back to the option ROM code, as illustrated in block 460. Therefore by modifying the stack, the option ROM may, as illustrated in block 470, monitor write requests (as in block 215, FIG. 2), log write requests (block 225, FIG. 2), or execute write to disk requests (block 230, FIG. 2).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   writing a dirty cache line to a disk drive prior to a disk driver loading;
   monitoring for a disk write request prior to said disk driver loading;
   maintaining a write log for a process that directly accesses the disk drive;
   utilizing said write log to update a disk cache and to maintain coherence with the disk drive; and
   determining if the disk drive has a stored indication to indicate that a write log is maintained for said disk drive and said disk drive cache.

2. The method of claim 1 further comprising logging said disk write request if said disk driver has not loaded.

3. The method of claim 2 further comprising executing said disk write request.

4. The method of claim 1 further comprising refreshing said cache line after said disk driver is loaded.

5. The method of claim 1 further comprising monitoring for said write requests by executing code that is stored in a second memory.

6. The method of claim 1 further comprising monitoring for said write requests by executing code that provides an interface between a basic input output system and a read only memory.

7. The method of claim 6 further comprising acknowledging a filter function.

8. The method of claim 7 further comprising executing said second memory code to record information of a write to said disk drive.

9. The method of claim 8 further comprising executing said basic input output system code to execute said write requests.

10. The method of claim 1 further comprising monitoring for said write requests by executing code that modifies a stack.

11. The method of claim 10 further comprising determining a stack offset.

12. The method of claim 11 further comprising using said stack offset to return control to an option read only memory.

13. An article comprising a medium storing instructions, that if executed, enable a processor-based system to:
  write a dirty cache line to a disk prior to a disk driver loading;
  monitor for a write request, prior to said disk driver loading;
  maintain a write log for a process that directly accesses the disk drive;
  utilize said write log to update a disk cache and to maintain coherence with the disk drive; and
  determine if the disk drive has a stored indication to indicate that a write log is maintained for said disk drive and said disk drive cache.

14. The article of claim 13 further storing instructions, that if executed, enable a processor-based system to log said write request if said disk driver has not loaded.

15. The article of claim 14 further storing instructions, that if executed, enable a processor-based system to execute said write request to said disk.

16. The article of claim 13 further storing instructions, that if executed, enable a processor-based system to refresh said cache line if said disk driver is loaded.

17. The article of claim 13 further storing instructions, that if executed, enable a processor-based system to monitor for said write request by executing code that is stored in an option read only memory.

18. The article of claim 13 further storing instructions, that if executed, enable a processor-based system to monitor for said write request by executing code that provides and interface for a basic input output system and an option read only memory.

19. The article of claim 13 further storing instructions, that if executed, enable a processor-based system to monitor for said write request by executing code that modifies a stack.

20. A system comprising:
  a processor;
  a disk drive coupled to said processor;
  a disk cache coupled to said processor and said disk drive; and
  at least one memory device coupled to said processor storing instructions that, if executed, enable said system to write a dirty cache line to said disk drive prior to loading a disk driver, monitor for a disk write request prior to loading said disk driver, maintain a write log for a process that directly accesses the disk drive, utilize said write log to update a disk cache and to maintain coherence with the disk drive, and determine if the disk drive has a stored indication to indicate that a write log is maintained for said disk drive and said disk drive cache.

21. The system of claim 20 wherein said at least one memory device stores instructions, that if executed, enable said system to log said disk write request if said disk driver has not loaded.

22. The system of claim 21 wherein said at least one memory device stores instructions, that if executed, enable said system to execute said disk write request.

23. The system of claim 20 wherein said at least one memory device stores instructions, that if executed, enable said system to a refresh cache line after said disk driver is loaded.

24. The system of claim 20 wherein said at least one memory device stores instructions, that if executed, enable said system to monitor for said write requests by executing code that is stored in an option read only memory.

25. The system of claim 20 wherein said disk cache comprises a polymer memory.

26. The system of claim 20 wherein said disk cache comprises ferroelectric polymer memory.

27. The method of claim 1 further comprising acknowledging a filter function for a second memory.

28. The method of claim 27 further comprising sending disk drive identification data to code executing from said second memory.

29. The method of claim 27 further comprising executing code from said second memory to write to a disk drive.

30. The method of claim 27 further comprising initializing a second memory as a drive request handler.

31. The method of claim 27 wherein said second memory further comprises an option read only memory.

32. The method of claim 30 further comprising determining a stack offset.

33. The method of claim 32 further comprising using said stack offset to return control to said second memory.

* * * * *